No. 658,808. Patented Oct. 2, 1900.
H. SIMMONS.
MOTOR WHEEL FOR AUTOMOBILES.
(Application filed Apr. 3, 1900.)
(No Model.) 2 Sheets—Sheet 1.
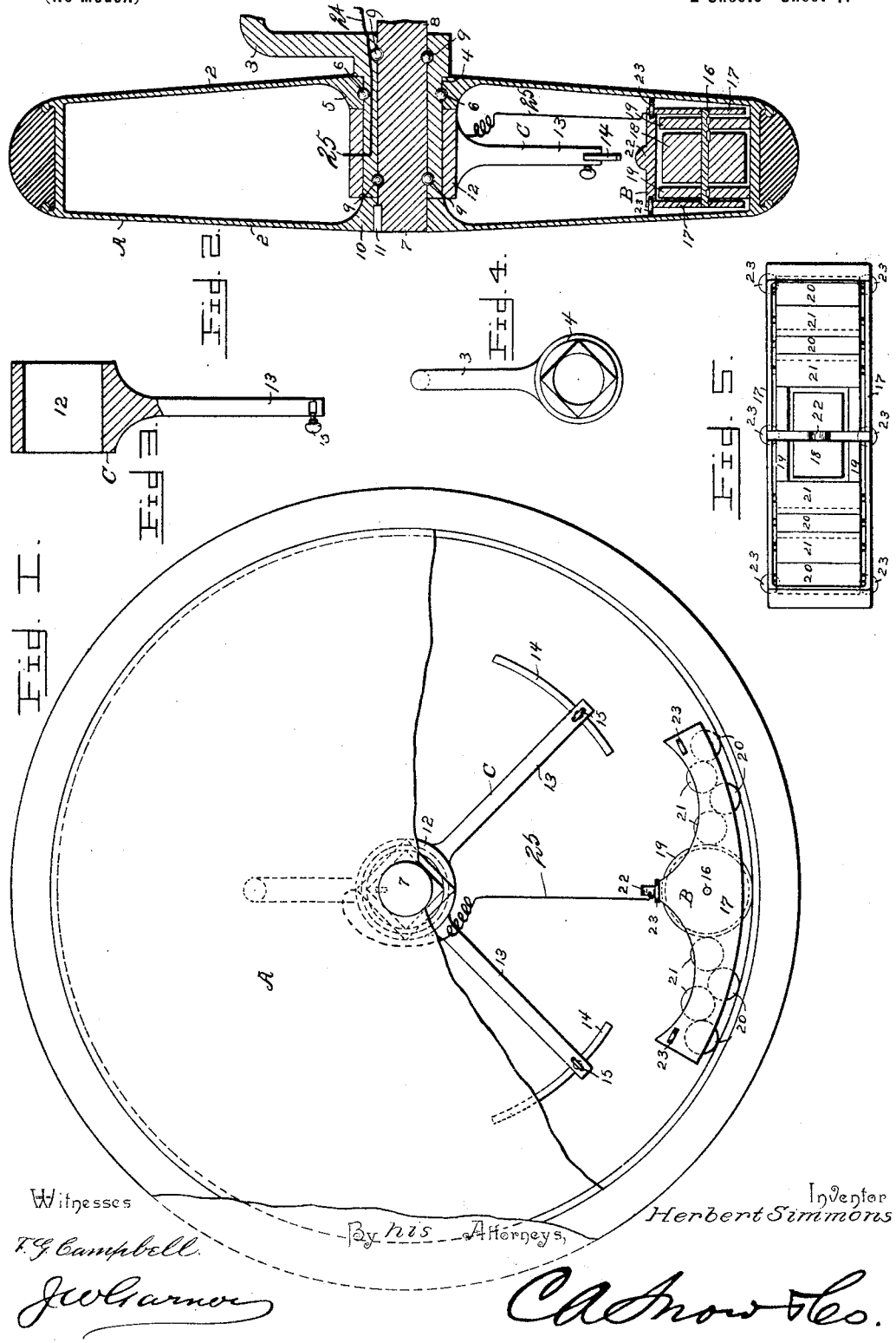
Witnesses
F. G. Campbell
J. W. Garner
Inventor
Herbert Simmons
By his Attorneys,
C. A. Snow & Co.

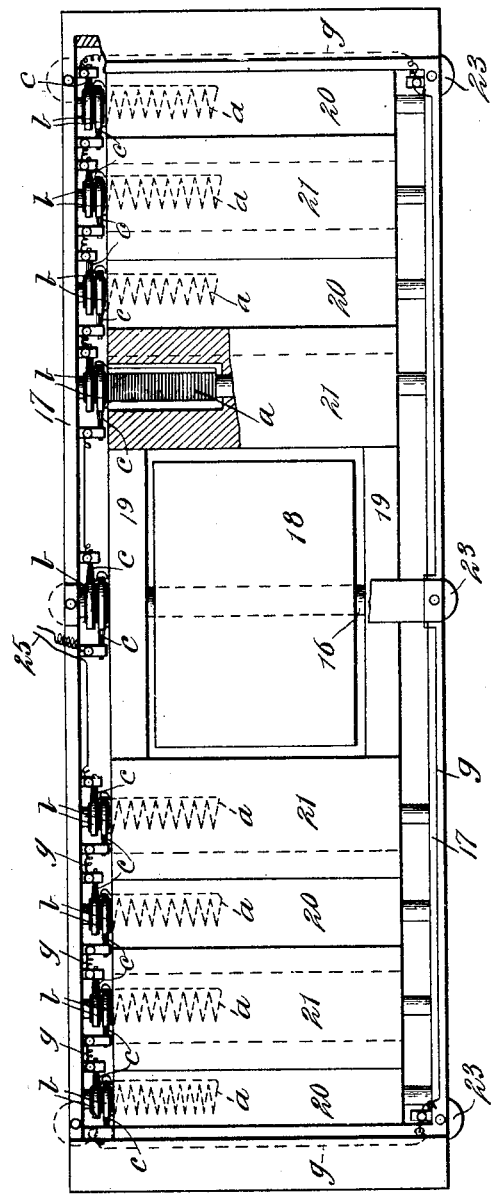

UNITED STATES PATENT OFFICE.

HERBERT SIMMONS, OF WELLSTON, OHIO.

MOTOR-WHEEL FOR AUTOMOBILES.

SPECIFICATION forming part of Letters Patent No. 658,808, dated October 2, 1900.

Application filed April 3, 1900. Serial No. 11,356. (No model.)

*To all whom it may concern:*

Be it known that I, HERBERT SIMMONS, a citizen of the United States, residing at Wellston, in the county of Jackson and State of Ohio, have invented a new and useful Motor-Wheel for Automobile Vehicles, of which the following is a specification.

My invention is an improved motor-wheel for automobile vehicles, the object of my invention being to provide an improved driving-wheel and a magnetized motor for applying power directly thereto by frictional contact with the inner rim of the wheel.

My invention consists in the peculiar construction and combination of devices hereinafter fully set forth, and pointed out in the claims.

In the accompanying drawings, Figure 1 is an elevation of a motor-wheel embodying my improvements with a portion of the outer side or casing of the wheel removed to disclose the interior construction thereof and the motor within the wheel. Fig. 2 is a vertical transverse central sectional view of the same. Figs. 3 and 4 are detail views. Fig. 5 is a top plan view of the motor. Fig. 6 is a detail top plan view of the motor, partly in section, on a larger scale, showing the electrical connections for magnetizing the rollers of the motor.

The wheel A is provided with an interior tread 1 on its rim, forming a runway or race for a motor B. As here shown, the wheel is provided with side disks 2, spaced apart and forming the sides of the runway; but the wheel may be constructed in any other suitable manner, if preferred. An arm or hanger 3, forming a part of the vehicle-frame or adapted to be secured to the body of the vehicle, as the case may be, is provided with an annular box 4, on which the inner side of the hub portion 5 of wheel A has its bearing, ball-bearings 6 being provided between the inner side of the hub of the wheel and the said annular box 4, as shown. The spindle 7 of an axle 8 is loose within the box 4, ball-bearings 9 being provided for said axle-spindle and annular box, as shown, and the outer portion 10 of the hub of wheel A is keyed to the projecting outer portion of the axle-spindle, as at 11. A stop C is arranged within the wheel and comprises the hub portion 12, which is secured on the box 4 and is non-revoluble thereon, and radial arms 13, which project from said hub portion. The arms 13 are at any desired angle and depend from the center of the wheel and are provided near their outer ends with adjustable stop members 14, comprising in the present construction curved rods which pass through openings near the outer ends of the stop-arms and are secured at any desired adjustment by set-screws 15, with which said stop-arms are provided.

The motor-shaft 16 is centrally disposed and journaled in bearings in the sides 17 of a frame, and said shaft is adapted to be rotated either by means of an electric motor (indicated at 18) or any other suitable form of motor, and the said shaft is provided with power-wheels 19, which engage the inner rim of wheel A frictionally and in rotating impart rotatory motion to said wheel A, as will be understood. I also provide a series of friction wheels or rollers 20, which are of less diameter than the driving-wheels 19 and have their bearings in the sides 17 of the motor frame or carriage, and motion is positively imparted to said rollers 20 by means of idle rolls 21, which frictionally engage said driving-wheels 19 and said rollers 20, as shown in Fig. 1. To increase the friction between the driving-wheels and rollers of the motor and the rim of wheel A, and hence increase the tractive power of the motor, said driving-wheel and rollers of the motor may be electrically magnetized in any suitable manner.

In Fig. 6 each of the rollers of the motor is shown as provided with a magnetizing-coil $a$. Connections between the coils and the cable 25 are made through the contact-rings $b$ on the shafts of the rollers, the brushes $c$, and conductors $g$.

Any other suitable means for electrically magnetizing the motor may be employed within the scope of my invention, and I do not limit myself in this particular.

It will be observed by reference to Fig. 1 of the drawings that the motor is adapted to travel in the lower side of the wheel A in the space between the stops, the frame of the motor being provided with a vertical extension 22 at its center, forming a stop which is adapted to coact with the adjustable stops 14, and that the motor by gravity tends to remain in the position in the lower side of the wheel indicated in Fig. 1. The frame of the motor is provided on its sides at suitable points with antifriction-wheels 23, which bear against the sides of the runway.

The operation of my invention is as follows: When the motor is started, its driving-wheels and rollers by frictional contact with the inner rim of the wheel A impart rotatory motion to the said wheel, and the motor also tends to crawl or travel upward in the runway of wheel A, a portion of the energy of the motor being thus employed in moving the motor in the runway, and hence the full power of the motor is not directly applied to the rotation of the wheel A and the propulsion of the vehicle, with the result that the vehicle is started gently and yet with constantly-accelerated speed until the crawling movement of the motor within the wheel is arrested by the coacting stops hereinbefore described, after which the full power of the motor is employed in the rotation of the wheel A. By reversing the direction of rotation of the driving-wheels and rollers of the motor the wheel A may be rotated in either direction, as will be understood.

The electric current may be supplied to the motor in any suitable manner within the scope of a skilled mechanic. In the drawings I show a conducting-cable 25, which is passed into the wheel through openings 24 in the annular box 4 and the hub portion 12 of stop C. This conducting-cable is connected to the motor and to a source of electricity in the usual manner, and the usual devices well known to those skilled in the art to which my invention relates are employed for controlling the motor.

Having thus described my invention, I claim—

1. The combination of the wheel having the runway and inner and outer hubs, the annular box on which said inner hub has its bearing, the axle-spindle loose in said annular box, and fast to the outer hub, and a motor having driving-wheels operating in the runway of said wheel, substantially as described.

2. The combination of the wheel having the runway and inner and outer hubs, the annular box on which said inner hub has its bearing, the axle-spindle loose in said annular box and fast to the outer hub, stops carried by said annular box, and a motor having driving-wheels operating in the said runway, the play of said motor being limited by said stops, substantially as described.

3. The combination of a wheel having a runway, a non-revoluble box forming a bearing for said wheel, said box being provided with stops, and a motor having driving-wheels operating in the said runway, between said stops, substantially as described.

4. The combination with a wheel having a runway, of a motor having driving-wheels operating in said runway, said motor being free to travel in said runway, and adjustable stops to limit the play of the motor, substantially as described.

5. The combination with a wheel having a runway, of a motor having magnetized driving-wheels operating in said runway, substantially as described.

6. The combination with a wheel having a runway of a magnetized motor having driving-wheels operating in said runway, substantially as described.

In testimony that I claim the foregoing as my own I have hereto affixed my signature in the presence of two witnesses.

HERBERT SIMMONS.

Witnesses:
A. E. JACOBS,
J. M. MCGARVEY.